Sept. 22, 1931.   O. E. H. FROELICH   1,824,014
DRIVING MECHANISM FOR MOTOR VEHICLES
Filed Aug. 22, 1927
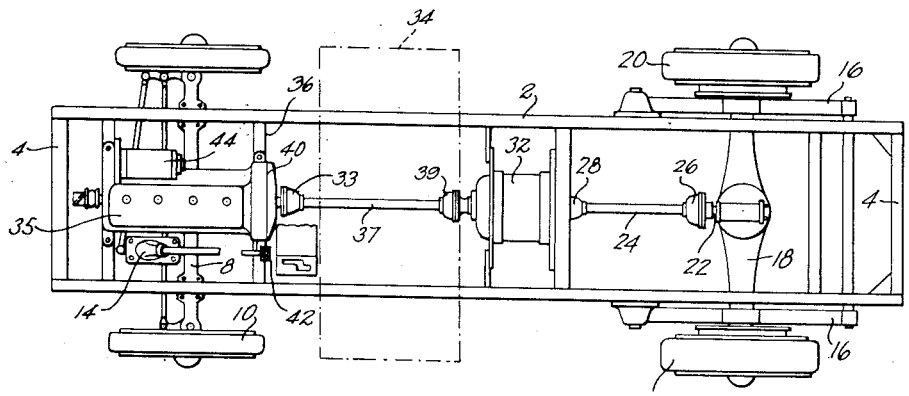
Fig. 1
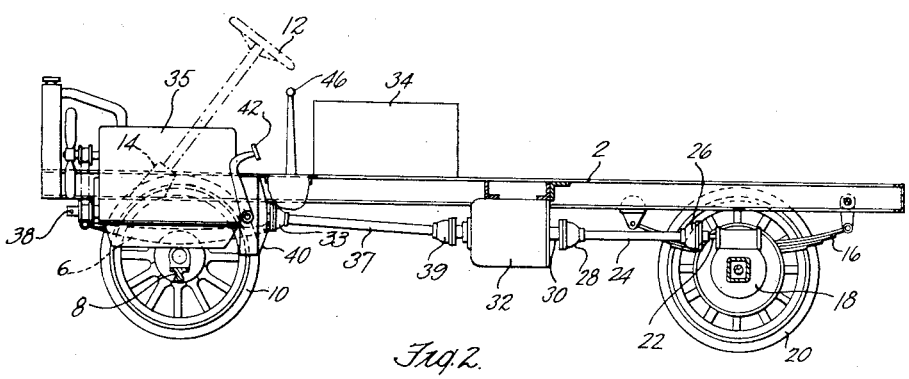
Fig. 2
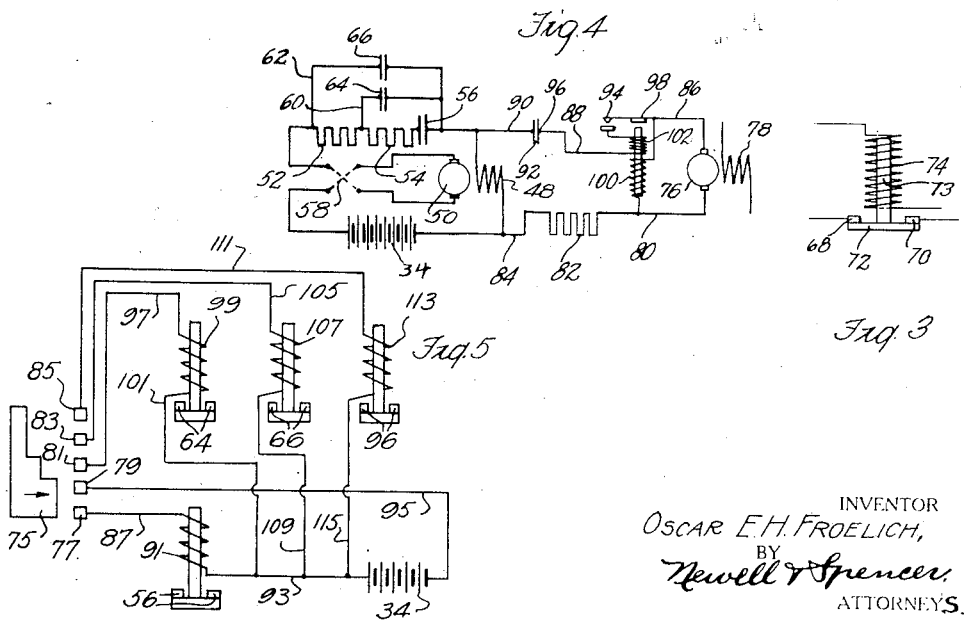
INVENTOR
OSCAR E. H. FROELICH,
BY
Newell & Spencer
ATTORNEYS.

Patented Sept. 22, 1931

1,824,014

UNITED STATES PATENT OFFICE

OSCAR E. H. FROELICH, OF QUEENS VILLAGE, NEW YORK, ASSIGNOR TO WARD MOTOR VEHICLE COMPANY, OF MOUNT VERNON, NEW YORK, A CORPORATION OF NEW YORK

DRIVING MECHANISM FOR MOTOR VEHICLES

Application filed August 22, 1927. Serial No. 214,547.

This invention relates to motor vehicles and more particularly to an improved power plant therefor.

The primary objects of the present invention are to improve the construction and mode of operation of motor vehicles of the commercial or truck type in which the principal driving power is derived from a motor driven from a storage battery, and to produce a vehicle of this type which may be run with greater efficiency and economy and which has a much greater cruising radius than prior vehicles of this type.

With the above and other objects in view, the invention consists of a motor vehicle embodying the novel and improved features, constructions and combination of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown. In the drawings—

Figure 1 is a plan view of a vehicle chassis provided with a driving mechanism embodying the present invention;

Figure 2 is a view in side elevation of the vehicle chassis;

Figure 3 is a detail view of one of the elements embodied in the vehicle driving and controlling mechanism;

Figure 4 is a diagrammatic view illustrating the electrical mechanism and the circuits therefor; and Figure 5 is a diagrammatic view illustrating the controller mechanism.

The chassis of the vehicle illustrated in the drawings of the present application comprises the usual frame consisting of longitudinal channel bars 2 and cross bars 4 connecting the longitudinal bars at the respective ends thereof. The front end of this frame is supported upon front springs 6 and the front axle 8 secured to said springs, to the ends of which axle are pivoted the usual wheel spindles. Upon these wheel spindles are mounted the front wheels 10 which are actuated to steer the vehicle from the steering wheel 12 through the steering gear indicated generally at 14. The rear end of the chassis frame is supported upon rear springs 16 and rear axle housing 18 attached to the springs within which housing, rotates the rear axle connected with the driving wheels 20. The rear axle is driven through a differential gearing from a shaft 22, which in turn is driven from a shaft 24 through a universal joint 26. The shaft 24 is driven through a universal joint 28 from a shaft 30, constituting the main shaft of an electric motor indicated at 32. The current for driving this motor is supplied from a storage battery 34 supported on the frame of the vehicle.

In the present form of the invention, the vehicle is provided with an auxiliary hydrocarbon motor 35 for driving the vehicle. The hydrocarbon motor is supported by cross-bars 36 of the vehicle frame. This motor may be of the four-cylinder type as shown in the drawings, or it may embody any desired number of cylinders and may be constructed to develop any desired horsepower. The hydrocarbon motor is provided with a main or crank shaft 38.

To enable the hydrocarbon motor to be connected with the driving wheels of the vehicle, a clutch 40 is provided for connecting the crank shaft 38 of the hydrocarbon motor with the shaft 30 of the electric motor. One member of the clutch is connected by means of a universal joint 33 with the forward end of the shaft 37, the rear end of which is connected by a universal joint 39 with the shaft 30 of the electric motor. This clutch, as shown, is of the friction clutch type though any other suitable form of clutch may be used. This clutch may be thrown into and out of engagement by any suitable mechanism under manual control. In the construction shown, the clutch is controlled by a foot lever 42 which is so arranged and connected with the clutch that when the lever is swung forwardly by the pressure of the foot of the operator, the clutch is engaged to connect the hydrocarbon motor directly with the main shaft of the electric motor 32. The members of the clutch preferably are normally held in disengaged relation by a suitable spring. The clutch lever 42 may be locked in position to hold the members of the clutch in engagement by a suitable locking device.

The hydrocarbon motor is arranged to drive a direct current generator 44, which is preferably directly connected by suitable gearing with the crank shaft 38 of said motor.

Fig. 4 of the drawings shows diagrammatically the circuits for the main driving motor 32 and for the generator 44. Current for the electric motor is supplied by the storage battery 34 and the electric motor is controlled as to direction of drive and speed by a suitable control lever 46.

As stated above, the electric motor constitutes the main driving motor for the vehicle. The vehicle may be driven by the electric motor and the hydrocarbon motor simultaneously, the hydrocarbon motor then acting as an auxiliary to assist the main electric driving motor, or the vehicle may be driven by the hydrocarbon motor alone under certain conditions.

As shown in Figure 4, the storage battery 34 is shown in circuit with the field 48 and with the armature 50 of the electric motor 32. In this circuit is also included resistances 52 and 54, an electromagnet circuit closer 56 and a reversing switch 58 for reversing the direction of the motor. Connected with this circuit are two shunt circuits 60 and 62, and in these respective shunt circuits are located electromagnetic circuit closers 64 and 66. The shunt circuit 60 passes around resistance 54 and the shunt circuit 62 passes around both the resistances 52 and 54. These shunt circuits, therefore, form means by which either or both resistances 52 and 54 may be cut out of the motor circuit to control the speed of the motor.

As heretofore stated, the circuit closers 56, 64 and 66 are preferably of the electromagnetic type and the operation of these elements is controlled preferably by operation of the control lever 46.

Figure 3 shows a construction which may be employed in such circuit closers. As shown in this figure, the circuit closer comprises two contacts 68 and 70 in the circuit and switch member 72 for bridging these contacts attached to a solenoid core 73 and a coil 74 surrounding this core for actuating the switch member 72. When the coil 74 is de-energized, the switch member 72 will be maintained in open position as shown in the drawings, by gravity. When the coil 74 is energized, the switch member 72 will be actuated to connect the contacts 68 and 70. The several coils of the circuit closer 56, 64 and 66 may be connected with a controller drum such as is ordinarily used with electric vehicles and this drum may be controlled from the lever 46 to energize these coils in proper sequence.

Fig. 5 of the drawings illustrates diagrammatically the mechanism for controlling the electric motor and certain associated parts.

As shown in Fig. 5, the controlled drum carries a contact member indicated at 75 arranged to engage a series of fixed contact members 77, 79, 81, 83 and 85. The contact 77 is connected by a conductor 87 with a coil 91 for actuating the contactor switch 56. This coil is connected by a conductor 93 with one terminal of the battery 34. The contact 79 is connected by a conductor 95 with the other terminal of the battery. The contact 81 is connected by a conductor 97 with a coil 99 for actuating the contactor switch 64. This coil is connected by a conductor 101 with the conductor 93. The contact 83 is connected by a conductor 105 with a coil 107 for actuating the contactor switch 66. This coil is connected by a conductor 109 with the conductor 93.

In starting the motor the controller drum is rotated in a direction to carry the contact 75 in the direction of the arrow. The contact 75 is so shaped that when the drum is actuated in this manner, the said contact will successively connect the circuits of the coils 91, 99 and 107 to close successively the switches 56, 64 and 66.

In the present construction, the truck is arranged to be driven normally with the clutch 40 engaged and the hydrocarbon motor 35 in operation. In the operation of the hydrocarbon motor, the fuel supply may be controlled to vary the speed of the motor and the ignition may be controlled directly by the driver of the vehicle, or both fuel supply and ignition may be automatically controlled. When the vehicle is running at low speed, the full torque characteristics of the main electric motor 32 are delivered to the driving wheels and the vehicle is then driven by the electric motor and by the hydrocarbon motor as an auxiliary thereto. When the vehicle is running at relatively high speed, as along level roads, the electric motor 32 is converted into a generator, the current of which is delivered to the storage battery 34 to charge the same and the vehicle is then driven by the power of the hydrocarbon motor alone. The change in the operation of the motor 32 from a motor to a generator is produced automatically when the vehicle reaches a predetermined high speed and the normal operation of the motor 32 as a motor is restored automatically when the speed of the vehicle falls to a predetermined low speed.

As shown in Fig. 4, the generator 44 is a shunt wound generator having an armature indicated at 76 and a field winding indicated at 78. The generator is arranged to be connected in circuit with the field windings 48 of the motor 32 by means of a conductor 80, a resistance 82 and a conductor 84 on one side of the generator and by means of conductors 86, 88 and 90 on the other side of the generator. The circuit of the generator and field windings 48 is open at two points 92 and 94 and is adapted to be closed respectively at these points by an electromagnetic contactor or circuit closer 96 and by an electromagnetic circuit breaker 98. The electromagnetic circuit closer 96 is similar in construction and mode of operation to the circuit closers 56, 64 and 66 and is actuated to close the break 92 when the lever 46 is actuated to throw the electric motor into high speed. As shown in Fig. 5, the fixed contacts engaged by the contact 75 on the controller drum include a contact 85 which is connected by a conductor 111 with a coil 113 for actuating the switch 96. This switch is connected by a conductor 115 with the conductor 93. The contact 75 is so formed that, at the same time that the contact 75 engages the contact 83 to connect the circuit of the coil 107, the contact 75 also engages the contact 85 to connect the circuit of the coil 113. The circuit breaker 98 comprises a coil 100 connected across the conductors 80 and 86.

When the vehicle speed attains a definite value so as to produce a predetermined generated voltage at the generator terminals, the reverse current circuit breaker or relay coil 100 will be sufficiently energized to operate the circuit breaker to close the break 94 and complete the generator circuit through the field magnet coils 48. This break will be maintained closed, except when the current falls to a very low point or the break 92 is opened, by means of a holding coil 102 in the generator circuit. If the vehicle speed is relatively high, the current in the electric motor circuit, on account of the inherent characteristics of the series type of electric motor, will be relatively low. The drop in electric potential voltage across the motor fields when a certain high speed is reached will be less than that produced at the generator 44. Before this speed is reached, the circuit breaker 98 will have been operated to close the break 94 in the generator circuit through the coils of the field magnet of the motor. The generator current will then flow through the field windings of the motor, reversing the flux emanated by the motor field coils and the motor 32 will then act as a generator to generate the current which is delivered to the battery to recharge the same. With the clutch engaged, the power of the auxiliary hydrocarbon motor not only will operate to propel the vehicle by means of the direct connection of the hydrocarbon motor with the electric motor shaft, but in revolving the armature of the motor 32 with the field flux reversed as stated above, the hydrocarbon motor will also operate to generate current to charge the battery. Thus with the clutch 40 engaged and the hydrocarbon motor in operation, when running at high speed, as along comparatively level roads, the vehicle will be driven by the hydrocarbon motor alone and the motor 32 will be transformed into a generator to charge the battery.

Whenever the speed of the vehicle is reduced as when the vehicle reaches a steep grade, the current in the electric motor circuit will increase and the drop in electrical potential across the motor fields will become greater and the generator current will be reduced. Under extreme load, the current generated by the generator 44 will be so small as to be ineffective to reverse the flux emanated from the field coils 48 of the motor or the circuit breaker 98 will open breaking generator circuit at 94 in the motor field circuit and the full torque characteristics of the electric motor 32 will then again be obtained. When the lever 46 is shifted to second speed position, the contactor 96 acts to break, at 92, the generator circuit through the field coils 48, thereby cutting off the generator from the motor 32 and the generator will thereafter have no effect on the motor operation regardless of the speed of the vehicle.

Thus, with the clutch 40 engaged and the hydrocarbon motor and electric motor in operation, the vehicle will be driven by the full power of the hydrocarbon motor and electric motor in combination when heavy road conditions requiring a high degree of power are encountered. When the vehicle reaches a stretch of road requiring little power, the vehicle is driven at high speed by the hydrocarbon motor alone, and the electric motor is transformed into a generator and delivers current to the battery to charge the same. This change in the operation of the power plant units is produced entirely automatically without any attention on the part of the operator of the vehicle. Furthermore, under coasting conditions, with the clutch 40 engaged, braking action may, if desired, be obtained by regeneration. When running down a steep grade, the ignition circuit of the hydrocarbon motor may be disconnected to throw the hydrocarbon motor out of driving operation. With the control lever 46 in high speed position to close the circuit closer 96, the vehicle will quickly reach a high speed sufficient to actuate the circuit breaker 98 to close the break 94 and the motor 32 will be transformed into a generator by the generator current through the motor field coils. The regenerative action of the motor 32 will then have a retarding effect on the vehicle to reinforce the action of the brakes.

A similar result may be obtained by maintaining the ignition circuit of the hydrocarbon motor so that the hydrocarbon motor continues in operation and disengaging the clutch 40 while running down a grade.

As stated above, the vehicle may be driven by the electric motor alone, the members of the clutch 40 then being disengaged to cut off the hydrocarbon motor from connection with the shaft 33. Also if desired, the vehicle may be driven by the hydrocarbon motor alone, without charging the battery, if desired. This result may be secured by moving the control lever 46 to "off" position while the hydrocarbon motor is in operation.

Having explained the nature and object of the invention and having specifically described a construction embodying the invention in its preferred form, what is claimed is—

1. A motor vehicle having in combination a vehicle body, wheels therefor, a storage battery, an electric vehicle driving motor operated by current supplied by said battery, a hydrocarbon motor, driving connections between said motors and certain of the vehicle wheels for driving the vehicle from both said motors simultaneously, means controlled automatically in accordance with the speed of the vehicle for converting the electric motor into a generator to charge the battery when the speed of the vehicle rises above a predetermined speed and for restoring the electric motor to its normal motor operation when the speed of the vehicle falls below a predetermined speed, and mechanism for throwing said means into and out of operation independently of the electric motor.

2. A motor vehicle having in combination a vehicle body, wheels therefor, a storage battery, an electric vehicle driving motor operated by current supplied by said battery, a hydrocarbon motor, driving connections between said motors and certain of the vehicle wheels for driving the vehicle from both said motor simultaneously, means controlled automatically in accordance with the speed of the vehicle for converting the electric motor into a generator when the speed of the vehicle rises above a predetermined constant speed, and for restoring the electric motor to its normal motor operation when the speed of the vehicle falls below a substantially constant speed and mechanism for throwing said means into and out of operating condition during the continued operation of the electric motor.

3. A motor vehicle having in combination a vehicle body, wheels therefor, a storage battery, an electric motor for driving the vehicle operated by current supplied by the battery, a hydrocarbon driving motor, means by which the vehicle is driven from both said motors simultaneously when the power required is relatively high, and mechanism controlled automatically in accordance with the speed of the vehicle for converting the electric motor into a generator to charge the storage battery when the speed of the vehicle rises above a predetermined speed and for restoring the motor to its normal motor operation when the speed of the vehicle falls below a predetermined speed, means for controlling the electric motor and means for maintaining said mechanism out of operation while said controlling means is in low speed condition and for throwing said mechanism into operation at a certain stage in the operation of said controlling means.

4. A motor vehicle having in combination a vehicle body having wheels, driving mechanism for the vehicle comprising a storage battery, an electric driving motor having an armature and field coils and operated by the current supplied by said battery, a hydrocarbon driving motor, means for connecting said motors to certain of the vehicle wheels for driving the vehicle from both said motors simultaneously, means for converting the electric motor into a generator to charge the storage battery when the power required is relatively low, comprising a generator driven from the hydrocarbon motor for sending a reverse current through the field coils of the electric motor, and means for controlling the connection between the generator and said coils.

5. A motor vehicle having in combination a vehicle body having wheels, driving mechanism for the vehicle comprising a storage battery, an electric driving motor having an armature and field coils and operated by the current supplied by said battery, a hydrocarbon driving motor, means for connecting said motors to certain of the vehicle wheels for driving the vehicle from both said motors simultaneously, means for converting the electric motor into a generator to charge the storage battery when the power required is relatively low, comprising a generator driven from the hydrocarbon motor for sending a reverse current through the field coils of the electric motor, and means controlled automatically in accordance with the speed of the vehicle for connecting said generator with and disconnecting the same from said field coils.

6. A motor vehicle having in combination, a vehicle body, wheels therefor, a storage battery, an electric vehicle driving motor operated by current supplied by said battery, a manually operable controller for said motor, a hydrocarbon motor, driving connections between said motors and certain of the vehicle wheels for driving the vehicle from both said motors simultaneously, means controlled automatically in accordance with the speed of the vehicle for converting the electric motor into a generator to charge the battery when the speed of the vehicle rises above a predetermined speed, and for restoring the electric motor to its normal motor operation when the speed of the vehicle falls below a predetermined speed, and mechanism for maintaining said means out of operation when the controller is in the lower speed positions and for throwing said means into operative condition when the controller is moved to high speed position.

Signed at Mount Vernon, N. Y., this 23rd day of July, 1927.

OSCAR E. H. FROELICH.